United States Patent Office 3,256,291
Patented June 14, 1966

3,256,291
NEUTRAL AND IONIC CHELATES OF 1-PYRAZOLEDITHIOCARBOXYLIC ACIDS WITH DIVALENT METALS OF ATOMIC NUMBER 24–30
Swiatoslaw Trofimenko, Philadelphia, Pa., assignor to E. I. du Pont de Nemours and Company, Wilmington, Del., a corporation of Delaware
No Drawing. Filed Mar. 8, 1965, Ser. No. 438,083
20 Claims. (Cl. 260—299)

This invention relates to, and has as its principal objects provision of, certain metal chelates in which the ligand is of novel structure and the synthesis of the same.

The new products of this invention are neutral and ionic chelates of 1-pyrazoledithiocarboxylic acid and C-substituted 1-pyrazoledithiocarboxylic acids with divalent transition metals of atomic number 24–30, inclusive. They are represented by one of the formulas:

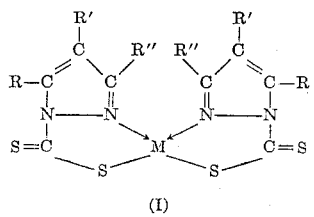

(I)

and

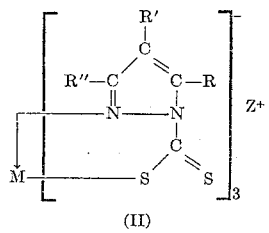

(II)

in which M is a divalent metal of the transition group having an atomic number from 24 to 30; R, R' and R", which may be the same or different, are hydrogen, hydrocarbyl radicals of 1 to 8 carbon atoms free from nonbenzenoid unsaturation, i.e., radicals in which any unsaturation is aromatic (alkyl, cycloalkyl, aryl, aralkyl, alkaryl), alkoxy of 1 to 6 carbon atoms, halogen, cyano or nitro; and Z, in the ionic chelates of Formula II, is an alkali metal cation or a tetraalkylammonium cation in which the alkyl groups have from 1 to 6 carbon atoms.

These chelates are prepared by bringing in contact, in a nonacidic, i.e., neutral to basic, liquid medium which is a solvent for both reactants, (a) an alkali metal salt of 1-pyrazoledithiocarboxylic or a C-substituted 1-pyrazoledithiocarboxylic acid, and (b) a salt of a metal of atomic number 24–30, the relative ratios of the two reactants being in the range of from about 1 mole to about 4 moles of (a) per mole of (b). This reaction leads directly to the chelates of type I, and to the chelates of type II where X is an alkali metal cation. The latter compounds can be converted to chelates of type II where X is a tetraalkylammonium cation by treatment in solution with a tetraalkylammonium halide. As will be discussed later, reactant ratios within the indicated range can be adjusted more precisely when it is desired to obtain chelates of one or the other type in preponderant amounts.

This process is represented by the following equations in which R, R', R" and M are as previously defined, Z' is an alkali metal cation and A is an anion associated with the metal M:

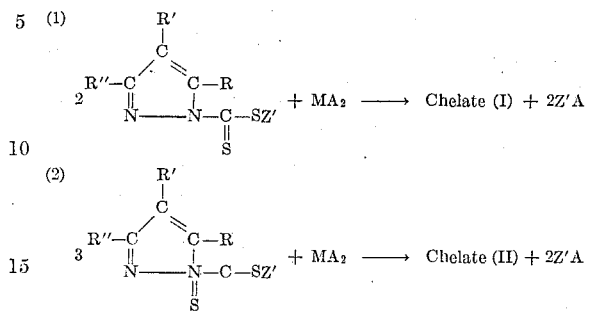

The 1-pyrazoledithiocarboxylic acid salts which constitute one of the starting materials are themselves new compounds. They are prepared by reacting carbon disulfide with an alkali metal pyrazolide in accordance with the equation

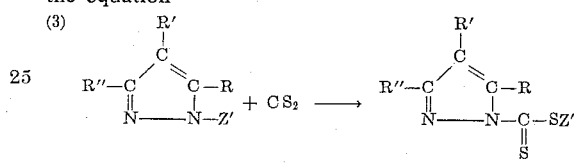

This reaction is conducted by contacting the reactants at a temperature of 0–50° C. and preferably in an inert solvent such as benzene, tetrahydrofuran or ethylene glycol dimethyl ether. The alkali metal pyrazolides are prepared by reacting the appropriate pyrazole with an alkali metal or alkali metal hydride [potassium pyrazolide has been described by Huckel and Bretschneider, Ber., 70, 2024 (1937)].

The following Examples A–D illustrate the preparation of some specific 1-pyrazoledithiocarboxylic acid salts:

*Example A.—Potassium 1-pyrazoledithiocarboxylate*

Half a mole of potassium pyrazolide in 1 l. of benzene was stirred and refluxed with 0.55 mole of carbon disulfide for 12 hrs. The slurry was filtered, washed with ether and air-dried yielding 91 g. (100%) of a dark yellow solid, M.P. 220–222° C. dec.

*Analysis.*—Calc'd. for $C_4H_3KN_2S_2$: C, 26.4; H, 1.65; S, 35.2. Found: C, 26.8; H, 1.79; S, 33.7.

The n-m-r spectrum has doublets at $1.11\tau$ (J=3) and $2.23\tau$ (J=1.4) and a quartet at $5.22\tau$ (J=3 and 1.4), all of equal area.

The compound is very soluble in water and methanol.

*Example B.—Potassium 3,5-dimethyl-1-pyrazolidithiocarboxylate*

Potassium metal (18.5 g., 0.475 mole) was added to 48 g. (0.5 mole) of 3,5-dimethylpyrazole in 1 l. of tetrahydrofuran (under nitrogen) and the mixture was stirred under reflux until hydrogen ceased to be evolved. An excess of carbon disulfide (70.5 mole) was added. A yellow solid formed exothermally. The mixture was refluxed briefly and stirred overnight. The solid was filtered, washed with tetrahydrofuran and air-dried. There was obtained 98.6 g. (98.6%) of dark-yellow solid soluble in water and methanol. It decomposed above 200° C.

*Example C.—Sodium 4-bromo-1-pyrazoledithiocarboxylate*

Sodium hydride (24 g. of 50% mineral-oil suspension, 0.5 mole) was stirred in 800 ml. of tetrahydrofuran. A solution of 73.5 g. (0.5 mole) of 4-bromopyrazole in 250 ml. of tetrahydrofuran was added slowly to the stirred suspension. Hydrogen was evolved briskly at room temperature. After completion of the addition the clear solution was refluxed 15 minutes and then 40 g. (0.53 mole) of carbon disulfide was added slowly. An exothermic reaction took place, and the solution turned red. It was filtered and was allowed to evaporate in the hood. There was obtained 97.7 g. (80%) of dark yellow-orange solid, soluble in water, alcohol and tetrahydrofuran.

*Example D.—Sodium 3,5-diphenyl-1-pyrazoledithiocarboxylate*

This compound, a yellow solid, was prepared by the method of Example C from 3,5-diphenylpyrazole, sodium hydride and carbon disulfide.

The other starting material used in the preparation of the chelates of this invention can be any transition metal salt which has appreciable solubility in water or in neutral, water-soluble organic solvents such as the lower alcohols, tetrahydrofuran, dioxane, dimethylformamide, dimethylsulfoxide, acetone and the like, or a mixture of these solvents with water. In these salts, the nature of the anion associated with the divalent metal is immaterial since it is not part of the reaction product. Thus, the anion may be inorganic, for example, halide, nitrate, nitrite, sulfate, sulfite, chlorate, borate, carbonate, phosphate, etc., or it can be organic, for example, formate, acetate, propionate, chloroacetate, benzoate, etc. The salts may be used in the form of their hydrates. Specific examples of suitable metal salts include $CrCl_2$, $$CrSO_4 \cdot 7H_2O$$

chromous oxalate, $MnSO_4$, $MnCl_2$, $FeBr_2$, $FeSO_4$, $$Co(NO_3)_2 \cdot 6H_2O$$

$CoSO_4$, cobaltous acetate, $NiF_2$, $Ni(ClO_4)_2 \cdot 5H_2O$, cupric formate, $CuBr_2$, $CuSO_4 \cdot 5H_2O$, $Cu(NO_3)_2 \cdot 3H_2O$, $ZnSO_4$, $Zn(ClO_3)_2 \cdot 6H_2O$, etc.

The chelate-forming reaction is conducted in any liquid medium having some appreciable solvent power for the 1-pyrazoledithiocarboxylic acid salt and the transition metal salt. Water is generally the most convenient reaction medium but organic solvents such as the alkanols of 1 to 4 carbon atoms, tetrahydrofuran, dioxane, dimethylformamide, dimethylsulfoxide, acetone, methylethyl ketone and the like may be used, either alone (if the solubility of the transition metal salt permits) or in admixture with water. The solvent should be neutral or basic, since an acidic solvent would tend to decompose the 1-pyrazoledithiocarboxylate.

Reaction is rapid and spontaneous. It is conveniently conducted at or near room temperature, i.e., in the range of 15–30° C., but higher or lower temperatures can be used, the only limitation being that imposed by the freezing and boiling points, respectively, of the solvent system employed. For practical reasons, a reaction temperature in the range of 0–100° C. is chosen.

When it is desired to prepare neutral chelates (type I), it is recommended to use the 1-pyrazoledithiocarboxylate in either a 2:1 molar ratio with respect to the transition metal salt or in a slightly lower ratio, e.g., 1.9:1. Still lower ratios such as 1 to 1.5:1 can be used, if desired. It is also best to add the ligand to the metal salt. Conversely, when it is desired to prepare a complex ion (type II chelate), the molar ratio of the 1-pyrazoledithiocarboxylate to the metal salt should be at least 3:1, and preferably in excess thereover, e.g., 3.5–4:1, and it is best to add the transition metal salt to the ligand solution.

When the molar ratio of the two reactants (in the order named) is between about 2:1 and about 3:1, mixtures of the two types of chelates are generally obtained, in which mixtures either type may predominate, depending not only on the relative reactant ratios but in part also on other factors such as the nature of the metal ion and the nature and number of substituents on the pyrazole nucleus. For example, reaction of an unsubstituted 1-pyrazoledithiocarboxylate with manganous or ferrous salts tends to give preferentially an ionic chelate (type II) unless the reactant ratios and operating conditions are such as to strongly favor formation of the neutral species. With alkyl-substituted 1-pyrazoledithiocarboxylates, on the other hand, neutral chelates (type I) form preferentially with all metal ions unless the operating conditions favor the formation of the ionic species. For use as pigmentary materials, the principal utility of the products of the invention, it is unnecessary to separate the chelate mixtures, when such are formed, into the type I and type II components. However, separation can be effected by taking advantage of the greater insolubility in water of the type I chelates and/or of the solubility in some organic solvents of the type II chelates as their quaternary ammonium salt, as discussed below.

The neutral chelates of type I are very insoluble in water and most organic solvents and precipitate out of the reaction medium as they form. They can be isolated by filtration and purified by washing with water or other suitable solvents. Some of the ring-substituted chelates are, however, soluble in certain solvents such as the aliphatic halohydrocarbons.

The complex ions of the type II are generally more soluble in water in the form of their alkali metal salts. Water-solubility is, however, influenced by the nature of the ligand and of the metal ion. When appreciably soluble, these chelates can be isolated by concentration of the aqueous solution, or by addition of a water-miscible organic liquid in which the chelate has low solubility, or by a combination of both methods. Preferably, these ionic chelates are isolated as their tetraalkylammonium salts, which are relatively insoluble in water but soluble in halohydrocarbons such as methylene chloride or chloroform, and thus can be isolated either by precipitation or solvent extraction. The tetraalkylammonium salts may be formed by adding to the reaction mixture, following reaction between the alkali metal 1-pyrazoledithiocarboxylate and the transition metal salt, a tetraalkylammonium halide (chloride, bromide, iodide) in which the alkyl groups, which need not be all alike, are, for example, methyl, ethyl, butyl, n-hexyl, etc. More advantageously, the tetraalkylammonium salt is initially present in the reaction mixture at the start of the chelate-forming reaction.

The following examples illustrate the invention. In these examples, room temperature and ambient pressure are employed unless otherwise noted.

*Example 1.—Potassium tris(1-pyrazoledithiocarboxylato)manganese(II)*

(Formula II: R=R'=R''=H, M=Mn, Z=K): A 4-g. sample of potassium 1-pyrazoledithiocarboxylate was dissolved in 90 ml. water and stirred with 20 ml. of 0.5 M manganous sulfate. The red-brown manganese chelate precipitated. It remained unchanged in heating up to 300° C. The infrared spectrum was characterized by bands at about 1370, 1310, 1230, 1095, 1065, 1035, 850 and 765 cm.[1]. This chelate consisted predominantly of the ionic species.

*Example 2.—Potassium tris(1-pyrazoledithiocarboxylato)iron(II)*

The procedure of Example 1 was substantially repeated substituting ferrous sulfate for manganous sulfate. A dark-blue precipitate of the iron chelate was obtained, consisting predominantly of the ionic species.

Example 3.—Bis(1-pyrozoledithiocarboxylato)cobalt(II)

(Formula I: R=R'=R''=H, M=Co): Substitution of cobaltous acetate for manganous sulfate in the procedure of Example 1 yielded 3.6 g. of a brown solid with a sharp infrared spectrum containing characteristic bands at 1320, 1250, 1150, 1070, 1040, 995, 855 and 760 cm.$^{-1}$. The chelate does not melt at temperatures up to 300° C. This chelate and those of the following three examples consisted of the neutral species.

Example 4.—Bis(1-pyrazoledithiocarboxylato)nickel(II)

The substitution of nickelous acetate for manganous sulfate in the procedure of Example 1 yielded 2.8 g. of an orangish solid with a sharp infrared spectrum: 3150, 1380, 1321, 1260, 1118, 1090, 1068, 1050, 1003, 912, 863 and 763 cm.$^{-1}$. The chelate did not melt below or at 300° C.

Example 5.—Bis(1-pyrazoledithiocarboxylato)copper(II)

The substitution of cupric for manganous sulfate in the procedure of Example 1 gave 3.2 g. of red-brown solid chelate which did not melt at temperatures up to 300° C. Its infrared spectrum had characteristic bands at 3140, 1370, 1315, 1250, 1200, 1160, 1077, 1048, 996, 910, 855 and 776 cm.$^{-1}$.

*Analysis.*—Calcd. for $C_8H_6CuN_4S_4$: C, 27.3; H, 1.71. Found: C, 27.6; H, 2.15.

Example 6.—Bis(1-pyrazoledithiocarboxylato)zinc(II)

The substitution of zinc chloride for manganous sulfate in the procedure of Example 1 yielded a yellow solid chelate which remained unchanged on heating up to 300° C. The infrared spectrum was more complicated than those of the preceding compounds, containing the bands of the copper compound and others in addition: for instance 789 and 845 cm.$^{-1}$.

Example 7.—Tetramethylammonium tris(1-pyrazoledithiocarboxylato)iron(II)

(Formula II: R=R'=R''=H, M=Fe, Z=(CH$_3$)$_4$N+): Potassium 1-pyrazoledithiocarboxylate (27.3 g., 0.15 mole) was dissolved in 600 ml. of water and treated with 50 ml. of 1 M ferrous sulfate solution. A deep-blue solution resulted. About 0.4 mole of tetramethylammonium chloride was then added. A dark-blue precipitate of the ionic chelate came down. It was filtered and washed well with water and dried (yield: 12.0 g.). A portion thereof was recrystallized from ethanol.

*Analysis.*—Calcd. for $C_{16}H_{21}FeN_7S_6$: N, 17.5. Found: N, 17.4.

The ultraviolet spectrum of this compound has maxima at 627 mμ (ε=10300); 360 mμ (ε=23900); 281 mμ (ε=29900).

The infrared spectrum has characteristic bands at 1305, 1215, 1095, 1083, 1030, 995, 985, 947, 895, 845 and 763 cm.$^{-1}$.

Example 8.—Tetramethylammonium tris(1-pyrazoledithiocarboxylato)manganese(II)

Potassium 1-pyrazoledithiocarboxylate (12 g., 0.066 mole) was dissolved in 100 ml. of water. Forty ml. of a 0.5 M solution of manganous sulfate was added to the solution along with 250 ml. of water. The dark solution was filtered and a solution of 5 g. of tetramethylammonium chloride in 50 ml. of water was added to the filtrate. The dark-brown precipitate of ionic chelate which formed was filtered, washed and dried (yield: 7.8 g.).

The infrared spectrum of the present compound is almost identical with that of the iron chelate of Example 7.

Example 9.—Tetraethylammonium tris(1-pyrazoledithiocarboxylato)nickel(II)

(Formula II: R=R'=R''=H, M=Ni, Z=(C$_2$H$_5$)$_4$N+):

To a stirred solution of 5.0 g. of potassium 1-pyrazoledithiocarboxylate in 100 ml. of water, mixed with 25 ml. of 1 M tetraethylammonium chloride and 100 ml. of methylene chloride, was added dropwise 25 ml. of 0.5 M nickel acetate. The solid that formed went quickly into the organic layer. The organic phase was separated, dried with magnesium sulfate and filtered. An olive-green solution was obtained. On brief boiling with 250 ml. of absolute ethanol, the olive-green ionic chelate precipitated (yield: 6.8 g.).

*Analysis.*—Calcd. for $C_{20}H_{29}N_7NiS_6$: C, 38.8; H, 4.69. Found: C, 39.2; H, 3.97.

Example 10.—Tetraethylammonium tris(1-pyrazoledithiocarboxylato)iron(II)

Following the procedure of Example 9, but substituting freshly prepared ferrous sulfate for nickel acetate, there was obtained on evaporation of the methylene chloride 7.3 g. of deep-blue crystals, of the ionic chelate.

*Analysis.*—Calcd. for $C_{20}H_{29}FeN_7S_6$: C, 39.0; H, 4.72; Fe, 9.09. Found: C, 39.6; H, 5.23; Fe, 8.54.

Example 11.—Bis(3,5-dimethyl-1-pyrazoledithiocarboxylato)nickel(II)

(Formula I: R'=H, R=R''=CH$_3$, M=Ni): Potassium 3,5-dimethyl-1-pyrazoledithiocarboxylate (10.5 g., 0.05 mole) was dissolved in 400 ml. of water. The solution was stirred and 50 ml. of 0.5 M nickel acetate solution was added. A red-brown solid chelate precipitated and was filtered and pressed dry. The crude product was dissolved in methylene chloride and purified by chromatography on alumina (packed and eluted with methylene chloride). The yield was 4.0 g. (40%). The pure compound was obtained as shiny red-brown crystals. They slowly turn grey on heating above 300° C.

*Analysis.*—Calcd. for $C_{12}H_{14}N_4NiS_4$: C, 35.9; H, 3.50; Ni, 14.6. Found: C, 35.8; H, 3.72; Ni, 14.4.

The infrared spectrum exhibits strong bands at about 1560, 1320, 1250, 1130, 1080, 1040, 980 and 880 cm.$^{-1}$.

Example 12.—Bis(3,5-dimethyl-1-pyrazoledithiocarboxylato)copper(II)

This chelate was prepared by the method of Example 11, using cupric sulfate as the metal salt and was obtained as a dark-brown solid. Its infrared spectrum was similar to that of the compound of Example 11.

Examples 13–18.—Metal chelates of 3,5-dimethyl-1-pyrazoledithiocarboxylic acid A number of transition metal chelates were prepared by adding aqueous solutions of metal salts to an aqueous solution of potassium 3,5-dimethyl-1-pyrazoledithiocarboxylate. The respective metal salts and the colors of the resulting precipitated chelates are shown in Table I.

TABLE I

| Salt: | Color of chelate |
|---|---|
| Mn(II) acetate | Yellowish. |
| Fe(II) sulfate | Black. |
| Co(II) acetate | Reddish. |
| Ni(II) acetate | Red-brown. |
| Cu(II) acetate | Black. |
| Zn(II) chloride | Yellow. |

The above chelates consisted predominately of neutral species (type I). The Co, Ni, Cu and Zn chelates could be extracted into methylene chloride.

Examples 19–24.—Metal chelates of 4-bromo-1-pyrazoledithiocarboxylic acid

These chelates were also prepared by adding aqueous solutions of appropriate metal salts to an aqueous solution of sodium 4-bromo-1-pyrazoledithiocarboxylate. The precursor salts and the colors of the resulting precipitated chelates are given in Table II.

TABLE II

| Salt: | Color of chelate |
|---|---|
| Mn(II) acetate | Fleshy pink. |
| Fe(II) sulfate | Deep blue. |
| Co(II) acetate | Dark brown. |
| Ni(II) acetate | Orange. |
| Cu(II) acetate | Red-brown. |
| Zn(II) chloride | Yellow. |

The above chelates consisted mainly of neutral species, admixed in varying proportions with ionic species.

The methods illustrated in the foregoing examples are equally applicable to any other alkali metal 1-pyrazoledithiocarboxylate of the general formula previously set forth. These materials are prepared as described in Examples A–D, starting with the appropriate pyrazole of formula

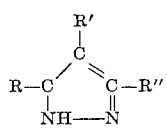

where R, R', and R" have the previously stated significance. The literature reports a large number of such pyrazoles, and they can be prepared by the methods described in the various publications.

Other illustrative examples of the products of this invention are the neutral and ionic chelates of divalent chromium, manganese, iron, cobalt, nickel, copper, and zinc in which the ligand is the 1-pyrazoledithiocarboxylate ion derived from the pyrazoles listed below (in these names, the 3- and 5-positions are interchangeable in view of the shift of bonds resulting from the tautomeric shift of the imino hydrogen):

3-bromopyrazole;
3,4,5-tribromopyrazole;
4-chloropyrazole;
3,4-diiodopyrazole;
3-bromo-4-methylpyrazole;
4-bromo-3,5-diphenylpyrazole;
4-chloro-3-octylpyrazole;
3,4-dichloro-5-methylpyrazole;
3-iodo-4,5-dimethylpyrazole;
4-methylpyrazole;
3,4-diethylpyrazole;
3,5-diethyl-4-methylpyrazole;
3,5-dipropylpyrazole;
3-t-butylpyrazole;
3-hexylpyrazole;
3-octylpyrazole;
4-phenylpyrazole;
3-methyl-5-phenylpyrazole;
3,4,5-triphenylpyrazole;
3-p-tolylpyrazole;
3-benzylpropazole;
3-cyclohexylpyrazole;
3-cyclopropyl-5-methylpyrazole;
3-methoxy-5-methylpyrazole;
4-ethoxypyrazole;
3,5-dipropoxypyrazole;
4-hexyloxypyrazole;
3-nitropyrazole;
4-nitropyrazole;
3-chloro-5-methyl-4-nitropyrazole;
3,5-diethyl-4-nitropyrazole;
4-nitro-3,5-diphenylpyrazole;
3-cyanopyrazole;
4-cyanopyrazole;
4-cyano-3-phenylpyrazole; etc.

The chelates of this invention are all colored solids characterized by great heat resistance and chemical inertness. These products are especially suitable for use as pigments because of the above-mentioned properties. For this use, the chelates of the invention can be compounded with any of the ingredients in general use in the paint and pigment industry, e.g., nondrying or drying oils, thinners, dryers, natural or synthetic resins, etc. They can be used as such or in admixture with extenders, fillers or other organic or inorganic pigments, white or colored. The compositions so obtained are suitable for any of the applications in which pigments are used, e.g., printing inks, protective and decorative coatings on metals, wood, stone, tiles, and the like, floor coverings, rubber and plastic compositions, leather articles, wax and chalk crayons, etc. The pigmentary properties of these chelates are readily tested by grinding a sample with a filler such as zinc oxide in mineral oil, applying the resulting paste onto a support such as a glass plate, and subjecting the coating to standard tests.

Since obvious modifications and equivalents in the invention will be evident to those skilled in the chemical arts, I propose to be bound solely by the appended claims.

The embodiments of the invention in which an exclusive property or privilege is claimed are defined as follows:

1. A chelate of the group consisting of

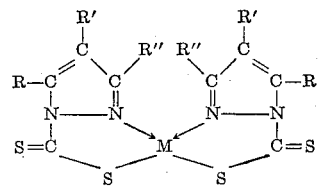

and

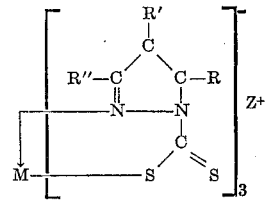

wherein:

M is a divalent transition metal of atomic number 24–30;
R, R' and R" are selected from the group consisting of hydrogen, halogen, cyano, nitro, hydrocarbyl of up to 8 carbons in which any unsaturation is aromatic, and alkoxy of 1–6 carbons; and
Z is selected from the group consisting of alkali metal cations and tetraalkylammonium cations in which the alkyl groups have 1–6 carbons.

2. A 1-pyrazoledithiocarboxylate chelate of a divalent transition metal of atomic number 24–30.

3. A 3,5-dimethyl-1-pyrazoledithiocarboxylate chelate of a divalent transition metal of atomic number 24–30.

4. A 4-bromo-1-pyrazoledithiocarboxylate chelate of a divalent transition metal of atomic number 24–30.

5. An alkali metal tris(1-pyrazoledithiocarboxylato)manganese(II).

6. An alkali metal tris(1-pyrazoledithiocarboxylato)iron(II).

7. Bis(1-pyrazoledithiocarboxylato)cobalt(II).

8. Bis(1-pyrazoledithiocarboxylato)nickel(II).

9. Bis(1-pyrazoledithiocarboxylato)copper(II).

10. Bis(1-pyrazoledithiocarboxylato)zinc(II).

11. Tetramethylammonium tris(1 - pyrazoledithiocarboxylato)manganese(II).

12. Tetraethylammonium tris(1 - pyrazoledithiocarboxylato)nickel(II).

13. The process of preparing a compound of claim 1 which comprises reacting, at a temperature in the range of 0–100° C., an ionic salt of a divalent transition metal of atomic number 24–30, with a second compound of the formula

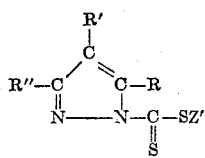

wherein:
R, R' and R'' are as in claim 1; and Z' is an alkali metal cation.

14. The process of claim 13 wherein the second compound is an alkali metal salt of 1-pyrazoledithiocarboxylic acid.

15. The process of claim 13 wherein the second compound is an alkali metal salt of 3,5-dimethyl-1-pyrazoledithiocarboxylic acid.

16. The process of claim 13 wherein the second compound is an alkali metal salt of 4-bromo-1-pyrazoledithiocarboxylic acid.

17. The process which comprises reacting, at a temperature in the range of 0–100° C., an alkali metal salt of 1-pyrazoledithiocarboxylic acid with a manganous salt.

18. The process which comprises reacting, at a temperature in the range of 0–100° C., an alkali metal salt of 1-pyrazoledithiocarboxylic acid with a ferrous salt.

19. The process which comprises reacting, at a temperature in the range of 0–100° C., an alkali metal salt of 3,5-dimethyl-1-pyrazoledithiocarboxylic acid with a nickel salt.

20. The process which comprises reacting, at a temperature in the range of 0–100° C., an alkali metal salt of 4-bromo-1-pyrazoledithiocarboxylic acid with a nickel salt.

References Cited by the Applicant

W. Huckel and H. Bretschneider, Ber., 70 2024 (1937).
Q. Mingoia, Gazz. Chim. Ital., 61, 449 (1931).

NICHOLAS S. RIZZO, *Primary Examiner.*

R. J. GALLAGHER, *Assistant Examiner.*

UNITED STATES PATENT OFFICE
CERTIFICATE OF CORRECTION

Patent No. 3,256,291　　　　　　　　　　　　　　　　June 14, 1966

Swiatoslaw Trofimenko

It is hereby certified that error appears in the above numbered patent requiring correction and that the said Letters Patent should read as corrected below.

Column 2, lines 10 to 17, the structural formula should appear as shown below instead of as in the patent

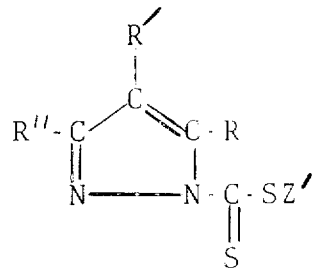

column 7, line 56, for "3-benzylpropazole" read -- 3-benzylpyrazole --; column 8, claim 1, the second structural formula, insert a double bond between the topmost "C" and the "C" to the lower right thereof.

Signed and sealed this 15th day of August 1967

(SEAL)
Attest:

EDWARD M. FLETCHER, JR.　　　　　　　　　　　　EDWARD J. BRENNER
Attesting Officer　　　　　　　　　　　　　　Commissioner of Patents